INVENTORS
ROBERT L. WHEARLEY
LEO J. NOVAK
BY FRITZ O. DEUTSCHER

ATTORNEYS

United States Patent Office 3,012,092
Patented Dec. 5, 1961

3,012,092
INSULATED ELECTRICAL EQUIPMENT AND PROCESS OF MAKING
Robert L. Whearley, Fort Wayne, Ind., and Leo J. Novak and Fritz O. Deutscher, Dayton, Ohio, assignors, by mesne assignments, to Rea Magnet Wire Company, Inc., Fort Wayne, Ind., a corporation of Delaware
Filed Dec. 2, 1957, Ser. No. 699,965
4 Claims. (Cl. 174—121)

This invention relates to improved insulated electrical conductors and to components produced therefrom such as electrical coils which will withstand temperatures of 500° C. (932° F.) and above; the invention also is directed to processes for the production of the improved conductors and components.

Conventional organic insulating materials for electrical purposes, such as cotton, paper and the resins, decompose at relatively low temperatures and hence limit the operating conditions of those devices in which they are employed. The usual inorganic materials having electrical insulating characteristics have not met with success in such applications, due to their lack of flexibility and their tendency to crack under manufacturing and service conditions. In the formation of electric coils, for example, the inorganic insulation, when subjected to tensile stress in the coil winding operation, tends to rupture and the electrical insulating quality is lost.

A primary object of this invention is to provide an insulated electrical conductor which overcomes the objectionable features of inorganic insulation employed heretofore.

An important object of the invention is to provide novel insulated electrical conductors which may be formed into electrical components such as coils.

A particular object of the invention is to provide novel processes for the insulation of electrical conductors and the formation thereof into electrical components such as electric coils.

In producing the insulated conductor of invention a layer of glass in fibrous form is first applied to the flexible bare conductor wire which is suitably magnet wire. Such fibrous glass may be in the form of a thread spiralled on the wire, a braid or a tape; in each instance the fibrous glass will not materially affect the flexibility of the wire and the fibrous glass winding will be porous and pervious, thus, of itself, affording only inadequate protection to the wire.

Over this first fibrous glass layer, which may be a borosilicate glass, there is applied or served a second layer of fibrous glass having a lower softening point; the softening point of the second layer is above 500° C. however. Fusion of this second layer, while maintaining the integrity of the higher softening point glass in the first layer, will occasion flow of the glass of the outer layer into the interstices of the inner layer and will effect a coating of the inner layer. Upon cooling the wire is completely glass insulated and firmly held to the glass.

Formation of the covered wire into an electrical component such as a coil may be effected while the low softening point glass is in a fused state; this relieves the glass fibers of both layers of strains and fiber breakage is inhibited.

Alternatively the coil may be formed initially and the fibers of lower softening point fused to cause flow of the glass into the interstices of the higher softening point fibers and to the conductor.

Most suitably the electrically insulated wire is annealed by heating for a period of time at annealing temperature of the glass of the outer layer and then cooling very slowly to room temperature. Such practice improves the electrical characteristics of the product.

The invention will be more fully understood by reference to the following detailed description and accompanying drawings wherein.

Figure 1:
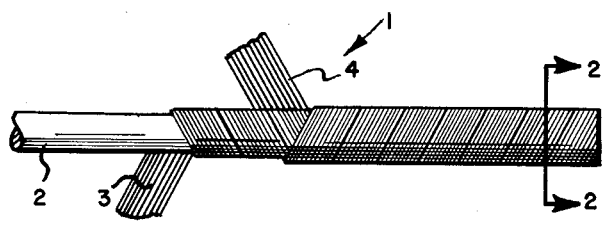
FIGURE 1 is a fragmentary side view of a conductor, somewhat enlarged, and having portions of the inner and outer insulation stripped back to illustrate the arrangement of the glass fibers.
Figure 2:
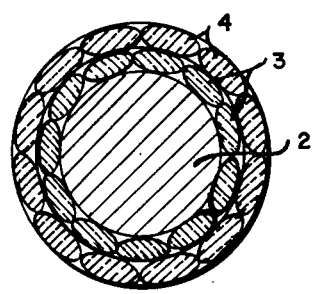
FIGURE 2 is a sectional view, somewhat enlarged, taken on line 2—2 of FIGURE 1.

Referring to the drawings, the numeral 1 in FIGURE 1 generally designates the insulated conductor utilized in the practice of the invention. As shown the copper magnet wire 2 is surrounded with a layer 3 of glass fibers; in the present instance these fibers comprise a plurality of threads, for example, ten threads each having a plurality of filaments, for example, about 200. The fibers (FIGURE 2) closely engage the wire and are thin relatively to the wire diameter.

The fibers of the layer 3 are preferably of relatively high softening point—about 1300° F. Higher softening fibers in the range of up to 1700° F. are suitable and practical for the purpose of the invention. The fibers of layer 3 must, of course, be flexible and maintain their integrity at the softening point of the lower softening glass. Borosilicate glasses serve this purpose well, are compatible with the conductor wire, and are not subject to deterioration with age.

In intimate association with the layer 3 is an outer layer 4 of glass fibers, also in the form of threads, each having a plurality of filaments, that is, about 200; suitably also ten threads are employed in the outer layer. In general the volume of the fibers of the outer layer is suitably at least about the same as the volume of the fibers of the inner layer. Also glass fibers of this outer layer are suitably wound oppositely to the thread of the inner layer, although such is not necessary. It is sufficient that the outer layer lies closely against the inner fibers.

If desired the fibers of the low fusion point glass may be formed with the fibers of the higher fusion point glass into a composite thread or yarn and applied to the wire in a single operation.

The glass fibers of the outer layer have a relatively low softening point—about 1150°–1200° F. Suitably the fibers for this purpose are of a high lead glass; glasses having relatively high percentages of lead oxide, boric oxide and aluminum oxide are readily fusible and useful; preferably also the fusible glass has a coefficient of expansion closely approaching that of the wire.

The application of a temperature to the conductor 1 having the wrap or covering of electrical insulating material sufficient to soften the outer glass fiber layer 4 causes the glass of this outer layer to lose its fibrous form and to flow slightly and enter the interstices of the fibers of the inner layer. The temperature should not attain the softening point of the fibers of the inner layer since it is desired that they maintain their integrity. Accordingly the protection afforded by the inner layer to the conductor is enhanced by the filling of the interstices with the lower softening point glass. This is an important feature since in operation at temperatures in excess of 500° C. (932° F.) components having exposed copper wire are materially subject to deterioration.

Further, the low softening point glass aids in securing the inner glass fibers to the wire, while the inner glass fibers, in coils, for example, serve to accurately space adjacent turns.

If desired the magnet wire to which the glass fibers is initially applied may have a thin coating of a resin to assist in adhesion of the fibers to the wire; such a resin as the methacrylates will then be burned off completely in the heat treatment without affecting the glass. Satisfactory coils have been made without any such treatment on the wire, however.

Figure 3:
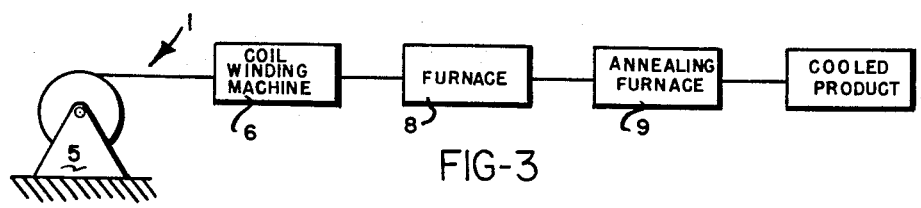
FIGURE 3 is a diagrammatic flow chart illustrating a method of making a coil in accordance with the invention.
Figure 5:
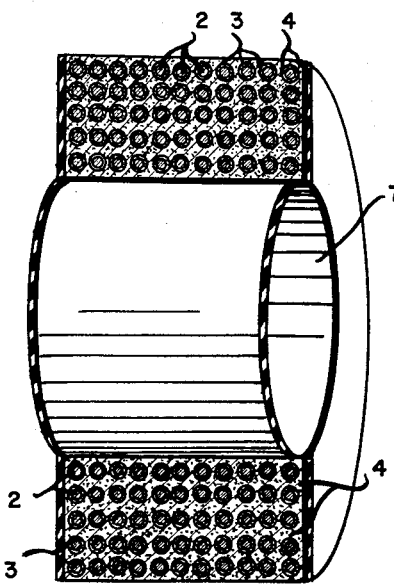
FIGURE 5 is a sectional view of a completed electrical coil.

One method of forming a coil is illustrated in FIGURE 3. The flexible insulated conductor 1 is unwound from a drum, reel or other convenient winding apparatus indicated at 5. It is then passed to a winding machine 6 and the coil formed on a bobbin of ceramic material as indicated at 7 in FIGURE 5. Steatite is suitable for this bobbin.

It is to be noted that insulated conductor 1 is not subject to deterioration and accordingly the insulated wire may be produced by the wire manufacturer and shipped to the coil manufacturer for the coil winding operation. From the winding machine the coils are delivered to furnace 8. Suitably the temperature within the furnace is just sufficient to insure full softening of the glass fibers of the outer layer. In the present instance a temperature of about 1200° F. (650° C.) was suitable for this purpose. The softened glass completely enclosed the higher softening point fibers 3 without any material movement of these latter fibers from contact with the wire. Further the spacings between turns were filled with the lower softening point glass.

From furnace 8 the coil then passed to the annealing furnace 9. In this operation the glass insulated coil was heated at about 500° C. for several hours and then cooled slowly to room temperature. Optimum annealing time will vary somewhat with coil size as well as the glass composition but such are readily determinable for a particular combination.

Figure 4:
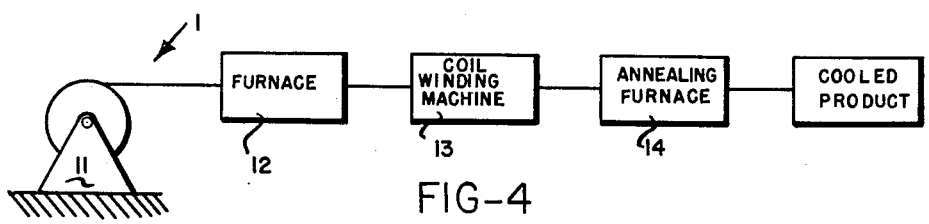
FIGURE 4 is another diagrammatic flow chart illustrating another method of forming a coil in accordance with the invention.

The insulated conductor 1 may also be subjected to a furnace treatment initially and wound into a coil while the outer layer softening point glass is in a softened state. Thus, as shown in FIGURE 4, the conductor 1 unwound from reel 11 is passed to furnace 12 operating at a temperature of about 1200° F. The conductor with the outer layer of glass softened is delivered to coil winding machine 13 and the coil wound; the coil winding machine may be at the furnace exit or within a chamber forming a part of or closely adjacent to the furnace to inhibit loss of heat from the softened glass. When the coil of a desired number of turns has been formed on one core the conductor is cut and directed to the formation of another coil on the same or a different winding machine.

Winding the coil while the outer glass fibers are soft tends to greater compaction of the turns and provides a somewhat better space factor for the coil.

After winding the coil is annealed in a furnace 14 in the manner previously described.

The coils formed by either of the procedures described exhibit substantially no fiber breakage; the low softening point glass as it sinters apparently envelops any fibers which might fracture in the coil formation. The glass further, in each method of production completely encloses the wire, providing excellent insulation, preventing shorts between adjacent turns. Further, electrical tests on the completed coils indicate that the electrical characteristics of the wire are not adversely affected by the methods of formation.

If desired the completed coil may be completely enclosed or encapsulated in inorganic material such as cast molten glass. Such tends to improve the appearance of the product.

The terms "sintering temperature," "softening temperature," and "fusion temperature" as utilized in this application are to be understood as referring to that point in the temperature scale at which the glass is soft enough to adhere to other glass and to flow sufficiently to enter the interstices of glass fibers in the form of tape, braid, threads and similar materials.

Glasses having the following constituents in percent by weight are useful as the low softening point glass in the practice of the invention:

|  | Range, percent | Specific Composition, percent |
| --- | --- | --- |
| $SiO_2$ | 45–55 | 52 |
| $Na_2O$, $K_2O$ | 8–12 | 10 |
| $CaO$, $MgO$ | 9–13 | 11 |
| $PbO$ | 18–22 | 20 |
| $Al_2O_3$ | 5–8 | 1 |
|  |  | 100 |

To aid fiberization and to procure specific softening points and temperature coefficients of expansion boric oxide and other materials known in the fiber glass industry may be added in small amounts. In general, a temperature differential between the high softening point glass and the low softening point glass of about 100° F. is satisfactory to permit retention of the integrity of the high softening point glass, while the glass of lower softening point fuses and fills the interstices of the structure and bonds the lower softening point fibers to the conductor, rendering the insulation impervious. Thus spacing of the conductors particularly in coil form is aided by the high softening point fibers due to the retention of their integrity.

When the initial conductor is in the form of magnet wire, for example, and comprises a thin resin coating of a heat decomposable vaporizable material, such as the methacrylates, polyurethanes and polystyrenes, it is preferable to heat the composite slowly to aid the depolymerization, decomposition and evaporation of the resin; thus heating the methacrylates at about 350° C. until the methacrylates evaporate completely from the wire is desirable prior to raising the composite to the fusing temperature of the low softening point glass. The resin evaporates without carbonization.

While the invention has been described with specific relation to copper wire and is concerned primarily with magnet wire wherein the wire dimensions may vary considerably, down to very fine wire, other materials and conductor shapes may be utilized; the softening point of the glasses may then be selected in accordance with the melting point temperature of such other conductors.

This application is related to:

Serial No. 657,893, Robert L. Whearley, Evert A. Mol, filed: May 8, 1957, title: Insulated Wire Particularly for Coils and the Manufacure Thereof;

Serial No. 661,169, Robert L. Whearley, filed: May 23, 1957, title: Electrical Apparatus and Method of Manufacturing the Same, now Patent Number 2,982,888.

Serial No. 661,170, Robert L. Whearley, filed: May 23, 1957, for: Insulated Winding and Process of Manufacture Thereof, now Patent Number 2,982,889.

Serial No. 700,044, Robert L. Whearley, Hermann C. N. Heckel, filed: December 2, 1957, for: Heat Resistant Insulated Electrical Components and Process of Making;

Serial No. 700,173, Robert L. Whearley, Hermann C. N. Heckel, filed: December 2, 1957, for: Electrical Components Insulated with Glass and Process of Making;

All assigned to the same assignee as the present invention.

The foregoing applications relate to the present application in that the structures involve relatively high melting point glass and a glass which is fusible at a lower temperature.

It will be understood that this invention is susceptible to modification in order to adapt it to different usages and conditions and accordingly, it is desired to comprehend such modifications within this invention as may fall within the scope of the appended claims.

What is claimed is:

1. The process which comprises the steps of, providing a flexible metallic conductor with electrical insulation in the form of relatively high softening point glass fibers and on the order of 1300 to 1700° F., covering said electrical insulation with relatively low softening point glass fibers, heating the composite thus produced sufficiently to soften the latter fibers to cause the softened glass fibers to flow into the interstices of higher softening point glass fibers compacting the insulation, winding the composite into a coil shape on a form, and cooling the composite.

2. The process which comprises the steps of, providing a flexible metallic conductor with electrical insulation in the form of relatively high softening point glass fibers and consisting of a borosilicate glass, covering said electrical insulation with relatively low softening point glass fibers and composed of a lead-oxide-silica glass, heating the composite thus produced sufficiently to soften the latter fibers to cause the softened glass fibers to flow into the interstices of higher softening point glass fibers compacting the insulation, winding the composite into a coil shape on a form while the said fibers are softened whereby the glass of said fibers is caused to flow under the winding pressure to cause a greater compaction of the insulation and turns of the winding, and thereafter cooling the composite.

3. The process which comprises the steps of covering a wire conductor with electrical insulation in the form of threads of borosilicate glass fibers spirally wound about said wire, sheathing said insulation with threads of lead-silica-glass fibers by winding the thread into intimate contact with said borosilicate glass fibers, winding the resultant sheathed and insulated wire into a coil shape, and fusing said lead-silica-glass fiber covering while maintaining the integrity of the borosilicate glass fibers to cause the lead-silica-glass to flow about turns of the coil and into the interstices of the borosilicate glass fiber covering.

4. A flexible electrical conductor comprising a length of an electrically conductive wire of coil shape, an inner covering layer consisting of high temperature softening glass fibers, said inner layer being in contiguous contact with said wire, said high temperature softening glass fiber covering being composed of borosilicate glass having a softening temperature between 1300 and 1700° F., and an outer sheath of glass fibers of a lower softening point than the fibers of the covering and contiguous with said covering and in intimate contact therewith, said outer sheath of glass fibers being composed of lead-silica-glass having a softening temperature between 1150 and 1200° F., said fibers of the outer sheath of glass fibers being wound oppositely to the fibers of said inner sheath, and said glass fibers of the outer sheath being heat-softened and caused to enter the interstices of the fibers of said inner layer and fused to said borosilicate glass fiber covering and providing an integral structure which is flexible and heat-resistant to a temperature of at least 932° F.

References Cited in the file of this patent

UNITED STATES PATENTS

| | | |
|---|---|---|
| 1,771,216 | Gossler | July 22, 1930 |
| 2,186,442 | Youmans | Jan. 9, 1940 |
| 2,227,931 | Greenleaf | Jan. 7, 1941 |
| 2,504,764 | Vollrath | Apr. 18, 1950 |
| 2,692,218 | Nicoll et al. | Oct. 19, 1952 |
| 2,848,794 | Roth | Aug. 26, 1958 |

FOREIGN PATENTS

| | | |
|---|---|---|
| 710,711 | Great Britain | June 16, 1954 |